(12) United States Patent
Paulsen et al.

(10) Patent No.: US 7,185,438 B2
(45) Date of Patent: Mar. 6, 2007

(54) METHOD AND APPARATUS FOR DETERMINING VEHICLE WHEEL GEOMETRY

(76) Inventors: Craig A. Paulsen, 1350 Monte Vista Dr., Reno, NV (US) 89511-9409; Phil L. Perry, 7185 Nicolaus Rd., Lincoln, CA (US) 95648

( * ) Notice: Subject to any disclaimer, the term of this patent is extended or adjusted under 35 U.S.C. 154(b) by 0 days.

(21) Appl. No.: 10/817,730

(22) Filed: Apr. 2, 2004

(65) Prior Publication Data
US 2005/0115088 A1    Jun. 2, 2005

Related U.S. Application Data

(60) Provisional application No. 60/526,741, filed on Dec. 2, 2003.

(51) Int. Cl.
*G01B 5/20* (2006.01)
(52) U.S. Cl. .................. 33/203; 33/203.18; 33/613
(58) Field of Classification Search .............. 33/203, 33/645, 203.18, 203.19, 203.2, 613, 203.12
See application file for complete search history.

(56) References Cited

U.S. PATENT DOCUMENTS

| | | | | |
|---|---|---|---|---|
| 3,956,830 A | * | 5/1976 | MacMillan | 33/337 |
| 4,114,283 A | * | 9/1978 | Spainhour et al. | 33/337 |
| 4,138,825 A | * | 2/1979 | Pelta | 33/228 |
| 4,337,581 A | * | 7/1982 | Eck | 33/288 |
| 4,594,789 A | * | 6/1986 | Marino et al. | 33/288 |
| 4,899,218 A | * | 2/1990 | Waldecker et al. | 33/288 |
| 5,056,233 A | * | 10/1991 | Hechel et al. | 33/288 |
| 5,191,713 A | * | 3/1993 | Alger et al. | 33/315 |
| 6,082,011 A | * | 7/2000 | Phillips, III | 33/203.15 |

OTHER PUBLICATIONS

"AcuStar II/DAS20, Dual Axis Clinometer", Schaevitz Sensors, pp. 154-155.
"Longacre Caster Camber Gauge Information, Setting Caster and Camber", Longacre Index, www.stockcarproducts.com/log9a.htm, 1 Page.
"Speed Partz Smart Tool Digital Angle Finder/Level", www.speedpartz.com/smarttool.htm, 1Page.
"Longacre Caster Camber Gauge", www.stockcarproducts.com/long9.htm, 3 Pages.

* cited by examiner

*Primary Examiner*—Yaritza Guadalupe-McCall
(74) *Attorney, Agent, or Firm*—Weide & Miller, Ltd.

(57) ABSTRACT

The invention is a method of determining the geometry of a wheel of a vehicle and/or the geometry of the associated support or drive structure. In one embodiment, a gauge includes caster and camber vials or an electro-mechanical sensor for outputting caster and camber angle to a display. In use, the gauge is aligned with or referenced to an indicator, such as a slot or marking. In one embodiment, the indicator has a reference position of zero degrees caster angle. The gauge measures the current position of the indicator compared to its reference position. The gauge includes a connecting element for maintaining it in alignment with the indicator, such as a threaded ring which engages the spindle or a magnetic ring engaging a wheel hub.

14 Claims, 7 Drawing Sheets

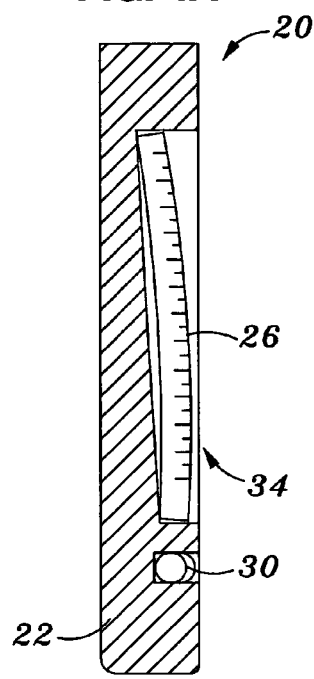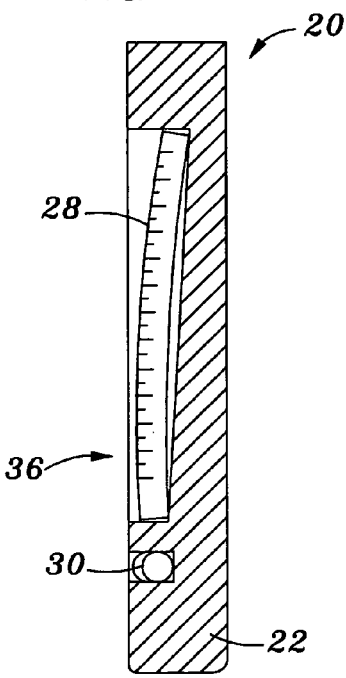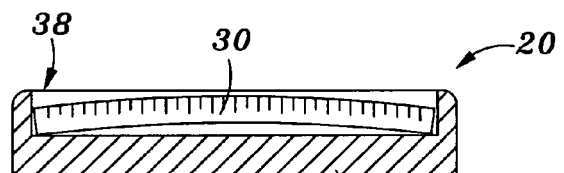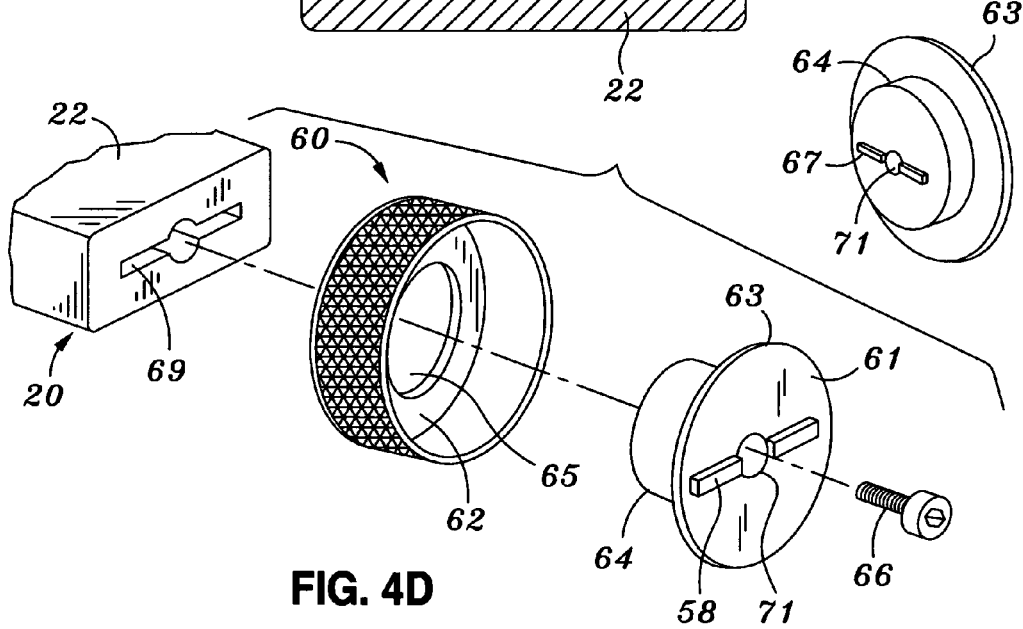

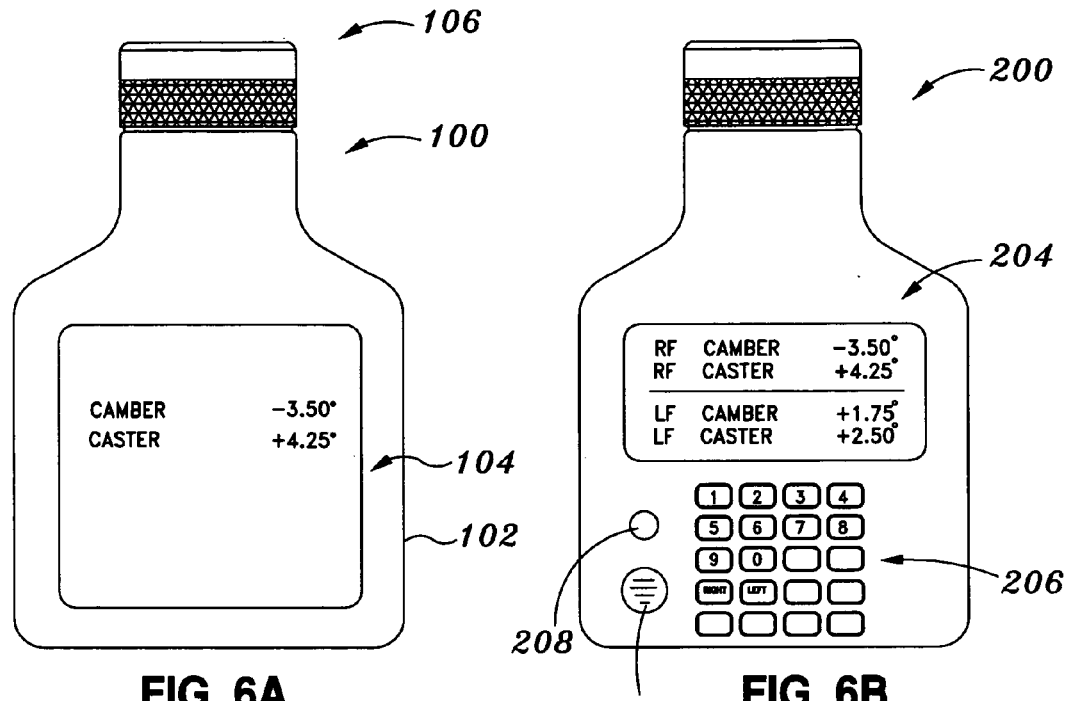
FIG. 6A  FIG. 6B
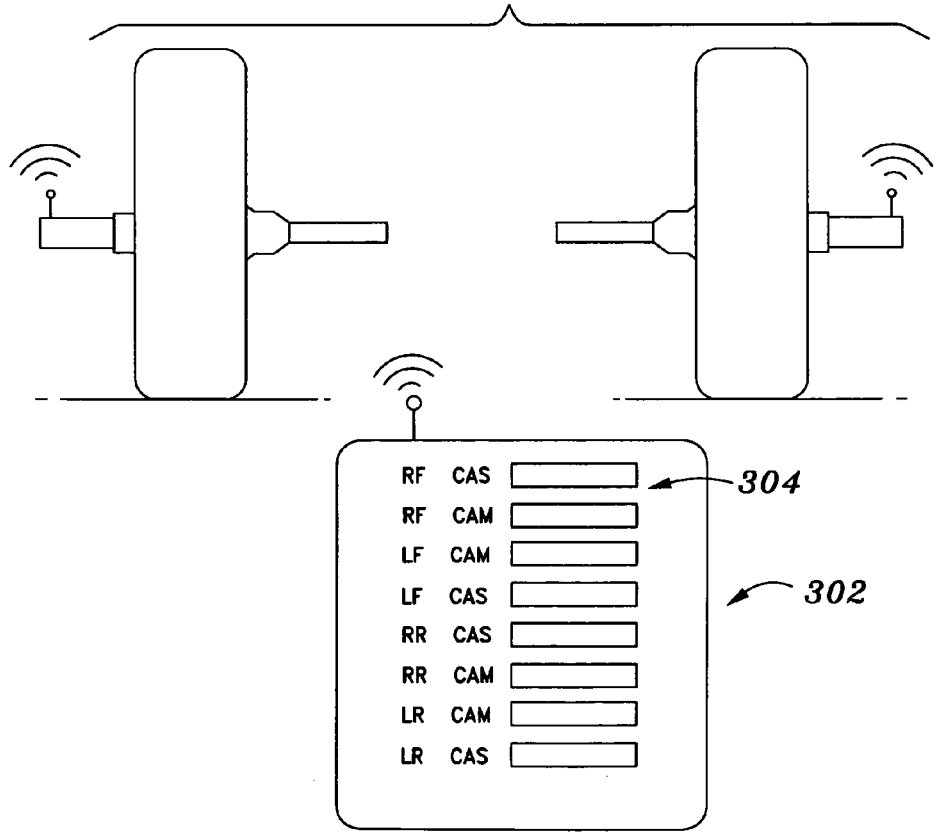
FIG. 6C

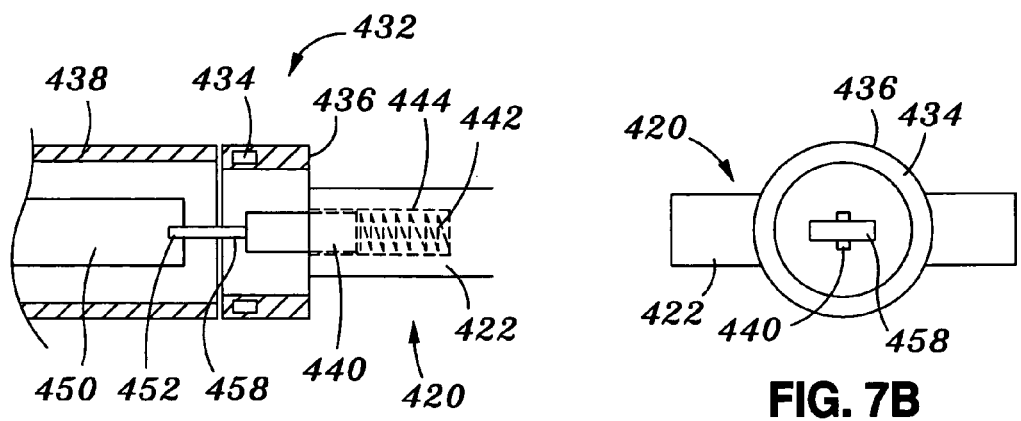
FIG. 7A
FIG. 7B
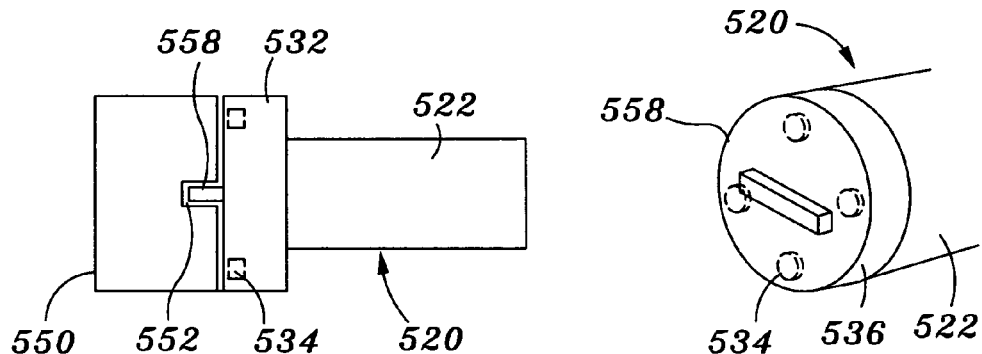
FIG. 8A
FIG. 8B
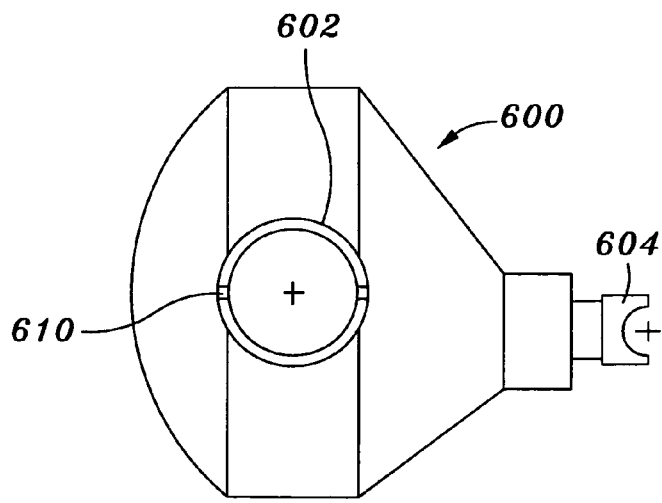
FIG. 9

FIG. 10
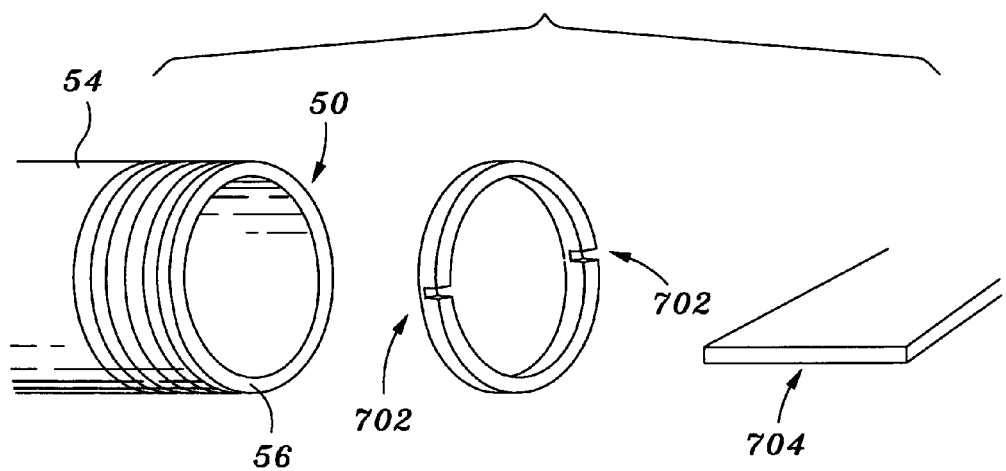
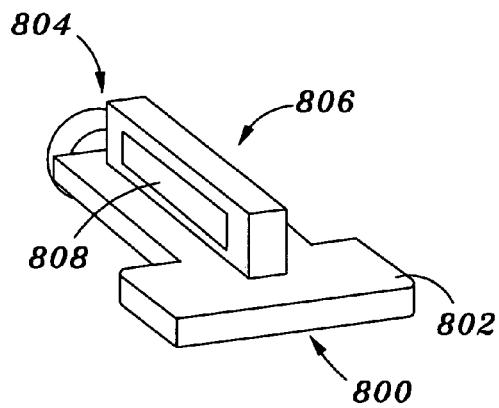
FIG. 11a
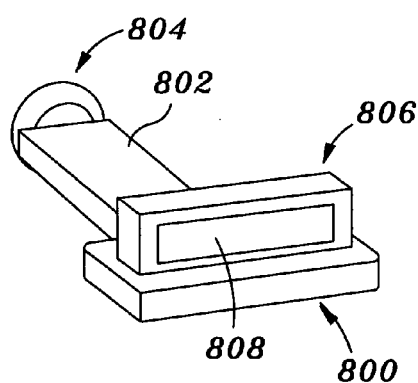
FIG. 11b

METHOD AND APPARATUS FOR DETERMINING VEHICLE WHEEL GEOMETRY

RELATED APPLICATION DATA

This application claims priority to U.S. Provisional Application Ser. No. 60/526,741 filed Dec. 2, 2003.

FIELD OF THE INVENTION

The present invention relates to methods and apparatus for determining the geometry of a wheel, such as the caster and camber of a wheel.

BACKGROUND OF THE INVENTION

Wheel geometry is very important to the proper operation of a wheeled vehicle, including the handling characteristics of the vehicle. For example, in the case of race cars, wheel geometry may have a tremendous bearing upon the ability of the car to travel quickly around the race course, and thus have an effect upon whether the driver can win the race.

Various devices have been devised for measuring the geometry of wheels of wheeled vehicles. Unfortunately, determining wheel geometry is relatively complex, as are the associated current devices and methods for determining the geometry.

There are several parameters which define wheel geometry. These parameters include toe, caster and camber. The present invention is particularly directed to solving problems associated with determining caster and camber.

The common method of mounting wheels so that they may be turned is to mount the wheel to a pair of ball joints. One joint, the upper ball joint, is mounted above the other ball joint, the lower ball joint. This type of mounting is well-known in the art of motor vehicle wheels.

The upper and lower ball joints need not be mounted in direct vertical alignment. In fact, moving the upper and lower ball joints out of vertical alignment is known to have substantial benefits. The angular departure of the upper and lower ball joints from perfect vertical alignment in a fore and aft direction is called caster. According to convention, caster of a vehicle wheel is negative if the upper ball joint of a vehicle is forward of the lower ball joint, and positive if the upper ball joint is aft of the lower ball joint. The caster of a wheel is measured in degrees and is zero degrees if both upper and lower ball joints reside in a vertical plane. FIG. 1 illustrates "caster" of a vehicle wheel.

As is known, a vehicle wheel with positive caster makes the wheel harder to turn, but results in "automatic steering." That is, forward motion tends to cause the vehicle wheel to move to the straight-ahead position (i.e. is "self-centering"). Thus, when traveling straight, the wheels tend to stay straight. When coming out of a turn, the wheels tend to move back to the straight position. On the other hand, a vehicle wheel with negative caster turns easily, but may tend to wander, lacking the self-centering effect to maintain the wheel straight.

Camber is the term used to describe the upright orientation of a vehicle wheel measured transversely. The camber of a wheel is measured in degrees and is zero degrees if the wheel resides in a vertical plane perpendicular to the road surface. Camber is negative if the top of the wheel is located inwardly toward the vehicle frame relative to the bottom of the wheel and positive if the top of the vehicle wheel is located outwardly from the bottom of the vehicle wheel relative to the vehicle frame. FIG. 2 illustrates "camber" of a vehicle wheel.

Wheel geometry may be determined by several known, complex procedures. In one embodiment, the wheel or axle spindle (i.e. axle end) upon which the wheel is mounted is exposed. This may require removing a wheel hubcap and spindle cap. Next, a conventional camber-caster gauge is positioned against the exposed end of the wheel spindle so that it bears against the wheel hub, the brake drum or rotor assembly.

The conventional camber-caster gauge is designed to abut the exposed end of the hub or rotor, and a pair of parallel degree gauges, one for measuring caster and one for measuring camber. The two parallel gauges are typically bubble gauges. The inclination of the caster gauge relative to a horizontal orientation can be adjusted.

The measurement of camber is performed with the wheel in exact fore and aft alignment. The camber bubble gauge will thereupon be oriented in a generally horizontal disposition perpendicular to the alignment of the vehicle frame. If the bubble in the bubble gauge rises toward the outboard side of the zero inclination mark of the gauge, a negative camber is indicated. Conversely, if the bubble in the gauge rises toward the inboard end of the gauge, a positive camber is indicated.

The caster bubble gauge is parallel to the camber bubble gauge. Caster is measured by first rotating the wheel so that the spindle is brought 20 degrees to the rear of alignment perpendicular to the orientation of the vehicle frame. The level of the caster bubble is adjusted so that the bubble is precisely at the zero mark on the gauge. The wheel is then turned to bring the spindle precisely 20 degrees forward of perpendicular alignment relative to the alignment of the vehicle frame and the gauge is then leveled. The extent to which the bubble in the caster gauge departs from the zero mark on the gauge is indicative of the caster measurement for that wheel. That is, a rise of the bubble toward the outboard end of the caster gauge will indicated a positive caster, while a migration of the bubble toward the inboard end of the gauge will indicate a negative caster.

To facilitate the turning of the wheels of the vehicle during the caster measuring procedure, it is advantageous to place the wheels upon turntables of a wheel alignment rack or upon portable turntables. This adds to the time and effort, however, of determining the wheel caster.

Corrections in wheel alignments are typically performed by installing eccentrics, shims or moving components in the slots of their attaching points. A combination of these methods may be used to correct the camber and caster settings to pre-defined specifications.

No known existing alignment apparatus achieves or fulfills the purposes of the present invention, namely, to accurately measure vehicle camber and caster without the need to rotate the wheels back 20 degrees, zero the gauge, and then turn the wheels 20 degrees in the other direction to obtain a caster reading. In addition, no known method permits simultaneous determination of camber and caster.

SUMMARY OF THE INVENTION

The invention is a method of determining or measuring the geometry of a wheel of a vehicle or its associated support structure. The invention includes apparatus for practicing the method.

In one embodiment, an indicator is associated with the wheel or its support structure. The indicator has a reference position, whereby changes in the position of the indicator associated with changes in wheel geometry, may be measured and compared to the reference position.

In one embodiment, the indicator comprises a slot or marking associated with an axle spindle. Preferably, the indicator is formed so that when a gauge is aligned therewith or referenced thereto when the actual caster angle of the wheel is zero degrees, the gauge reads zero degrees. Various embodiments of the invention comprise methods for creating the indicator in the desired position.

The position of the indicator changes as the caster angle of the wheel changes. The new position of the indicator yields the change in caster angle relative to the reference position (which is preferably zero degrees).

Various embodiments of the invention comprise gauges for measuring wheel geometry. In one embodiment, the gauge comprises a body containing one or more bubble vials. The vials may include a caster vial and a pair of camber vials (a positive angle and a negative angle camber vial). Alternatively, the gauge may include an electromechanical sensing device and a display configured to display caster and/or camber position information.

The gauge of the invention may be utilized to measure caster angle of a wheel. In use, the gauge is preferably aligned with or referenced to the indicator. So aligned, the gauge yields a caster angle associated with the current indicator position. When the indicator reference position is zero degrees actual caster angle, then the output of the gauge yields the actual caster angle in degrees (positive or negative).

The gauge may also be utilized to measure camber angle. In use, the gauge is pressed against the support structure. The gauge then outputs or yields the current camber angle.

In one embodiment, means are provided for aligning the gauge with the indicator. In one embodiment, where the indicator comprises a slot, the gauge includes a key configured to engage the slot.

The gauge preferably also includes means for connecting the gauge to the wheel support structure to maintain it in position during use. In one embodiment, the gauge includes a threaded locking ring for mating with threads on the axle spindle. In another embodiment, the gauge includes one or more magnetic elements configured to connect to the axle spindle face or a wheel hub.

The method and apparatus of the invention have numerous advantages. First, the method and apparatus permit measurement of the caster angle of a wheel without having to mount the wheel upon a turntable or platform and without having to move the wheel from side to side to obtain multiple measurements. Further, the method and apparatus permit simultaneous measurement of both caster and camber angle.

The method and apparatus of the invention may be utilized to measure other wheel geometries. In one embodiment, the gauge of the invention may be utilized to measure the position of a rear axle drive housing.

Further objects, features, and advantages of the present invention over the prior art will become apparent from the detailed description of the drawings which follows, when considered with the attached figures.

DESCRIPTION OF THE DRAWINGS

FIG. 4(a) is a first cross-sectional side view of the caster/camber gauge illustrated in FIG. 1(a);

FIG. 4(b) is a second cross-sectional side view of the caster/camber gauge illustrated in FIG. 1(a);

FIG. 4(c) is a third cross-sectional view of the caster/camber gauge illustrated in FIG. 1(a);

FIG. 4(d) is an exploded view an indicator engaging member of the caster/camber gauge illustrated in FIG. 1(a);

FIG. 4(e) illustrates a key mount portion of the indicator engaging member illustrated in FIG. 4(d);

FIG. 6(a) illustrates another embodiment gauge in accordance with the invention;

FIG. 6(b) illustrates yet another embodiment of a gauge in accordance with the invention;

FIG. 6(c) illustrates a measuring system in accordance with the invention, the system including at least one gauge and a base station;

FIG. 7(a) illustrates another embodiment gauge in accordance with the invention, the gauge configured to connect or mount to a wheel hub with a magnetic connection;

FIG. 7(b) is an end view of the gauge illustrated in FIG. 7(a);

FIG. 8(a) illustrates another embodiment gauge in accordance with the invention, the gauge configured to connect or mount to an axle spindle with a magnetic connection;

FIG. 8(b) is a perspective end view of the gauge illustrated in FIG. 8(a);

FIG. 9 illustrates a method of determining the geometry of a rear axle using a gauge of the present invention;

FIG. 10 illustrates a slot-containing spindle nut for use in forming one or more slots in a spindle for engagement by a gauge of the invention;

FIG. 11(a) illustrates yet another embodiment gauge of the invention, the gauge configured to measure camber; and FIG. 11(b) illustrates the gauge of FIG. 11(a) configured to measure caster.

DETAILED DESCRIPTION OF THE INVENTION

The invention is a method and apparatus for determining wheel geometry. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a method and apparatus for determining wheel geometry. Preferably, the method and apparatus are useful in determining the caster and camber angles of a wheel or the supporting structure or elements of such a wheel, such as an axle spindle or rear axle housing. The wheel may be that of a vehicle. Such a vehicle may comprise, for example, the front and/or rear wheels of a car or truck, including a race car. The invention has applicability to other vehicles which are wheeled where wheel geometry is important. Such vehicles may include, but are not limited to, aircraft, fork-lifts, earth-moving equipment and the like.

One embodiment of the invention comprises a unique caster-camber gauge. The gauge is referred to as a caster-camber gauge since it is useful in measuring or determining either or both the caster and camber angles of a wheel. As described herein, however, the gauge has applicability in determining or measuring other wheel geometries, such as the position of a rear axle housing. By "geometry" it is meant the position, such as in degrees of offset relative to a reference position (such degrees offset from vertical or horizontal).

Figure 3B:
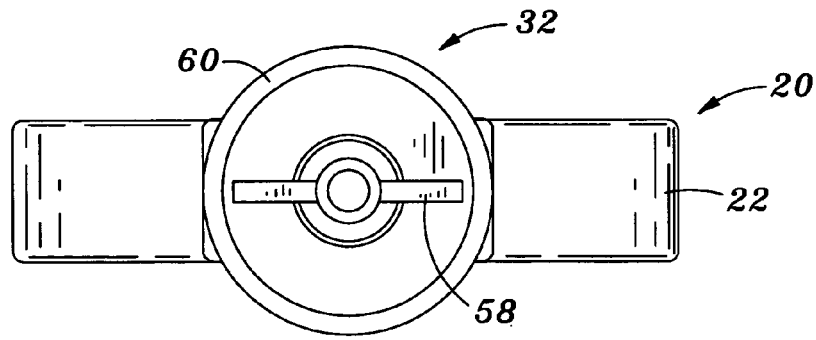
FIG. 3(b) is an end view of the caster/camber gauge illustrated in FIG. 1(a)
Figure 3A:
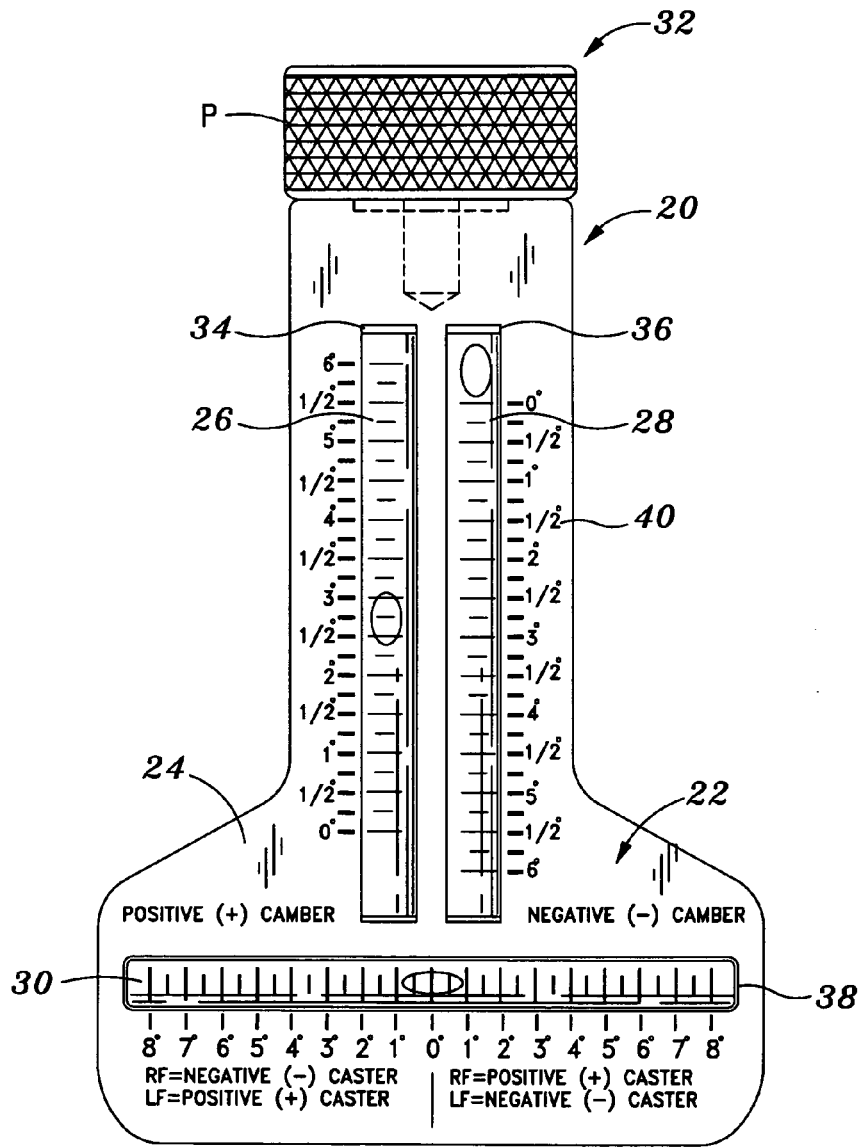
FIG. 3(a) is atop view of a caster/camber gauge in accordance with the present invention.

Referring to FIG. 3(a), in a preferred embodiment, a caster-camber gauge 20 comprises a body 22. The body 22 is designed to support various measuring instruments and designed to engage an indicator, as described in more detail below. The body 22 may have a variety of shapes and be constructed from a variety of materials. In one embodiment, the body 22 is constructed of billet aluminum.

As illustrated, the body 22 defines an instrument mounting surface 24. Preferably, this mounting surface 24 is generally planar. In one embodiment, as described below, sensors are connected to the body 22. Preferably, these sensors are configured to sense the position of the body 22, and more preferably, the angular position of the body relative to horizontal.

In one embodiment, the sensors comprise a first camber vial 26, a second camber vial 28 and a caster vial 30. These vials 26,28,30 all comprise an elongate tubular body containing fluid and an air bubble. In a preferred embodiment, as illustrated in FIGS. 4(a) and 4(b), the vials 26,28,30 are arched, having a central section which is higher than end sections thereof, whereby the air bubble is aided in its movement to the highest position of the vial, depending upon the position of the vial. The configuration and operation of such vials are well known, and the particular vials for practicing the invention are manufactured by the W. A. Moyer Company of Emporia, Kans. In addition, other types of vials may be used including, but not limited to, circular bubble vials.

As illustrated, the vials 26,28,30 are all mounted to the body 22. In the preferred embodiment, the vials 26,28,30 are all mounted in corresponding slots 34,36,38 formed in the mounting surface 24, and are thus located in the same place as the body 22.

As described in more detail below, the gauge 20 is configured to align with or reference an indicator associated with a wheel. As such, in one embodiment, the gauge 20 includes an engaging mechanism 32. As illustrated, the engaging mechanism 32 is located at one end of the body 22. The engaging mechanism 32 includes an engaging face (described in more detail below) which lies in a plane which is perpendicular to the mounting surface 24.

The pair of slots 34,36 which contain the first and second camber vials 26,28 extend in a direction generally perpendicular to the plane of the engaging mechanism 32. The third slot 38, which contains the caster vial 30, extends perpendicular to the first and second slots 34,36 (and thus extends in a plane which is generally parallel to the plane P). In the embodiment illustrated, the body 22 is generally "T"-shaped, corresponding to the location and sizes of the vials 26,28,30. The body 22 may have other shapes, however. For example, the body 22 could be circular or square in peripheral shape.

The vials 26,28,30 may be mounted to the body 22 in various ways. In one embodiment, they are connected permanently using an adhesive, such as a silicon adhesive. They may also be mounted with brackets or in other ways known to those of skill in the art.

In operation, as described in more detail below, changes in the position of the body 22 of the gauge 20 are reflected by changes in the location of the captured air bubbles in the vials 26,28,30. The position of a bubble in its respective vial 26,28,30 is representative of a sensed position of the wheel. Display elements provide the user with information regarding the wheel position represented by the position of the bubbles or "output" of the vial sensors. In one embodiment, the display elements comprise markings 40 located on the body 22 adjacent each vial 26,28,30. The markings 40 provide information regarding the wheel location represented by the location of the bubble in each vial 26,28,30. In one embodiment, the markings 40 provide information regarding the caster and camber angles in degrees.

In a preferred embodiment, the first camber vial 26 is configured to sense and indicate the camber angle of a wheel when that angle is positive, i.e. zero (0) degrees or larger. As such, the first camber vial 26 may be referred to as the positive camber vial. The second camber vial 28 is configured to sense and indicate the camber angle of a wheel when that angle is negative, i.e. zero (0) degrees or larger. As such, the second camber vial 28 may be referred to as the negative camber vial.

Preferably, the positive and negative camber vials 26,28 are mounted to the body 22 so that they read zero (0) degrees when the body is level (i.e. in a horizontal plane). In order to accomplish this, as illustrated in FIGS. 4(a) and 4(b), the positive and negative camber vials 26,28 may need to be mounted at an angle with respect to the body 22. This mounting offsets the curve of the vials.

The markings 40 may be associated with the vials 26,28, 30 in various manners. The markings 40 may be printed upon the body 22, such as by silkscreening or other printing methods, be located on a sticker or other element which is then connected to the body 22, and may even be directly located on the vials 26,28,30 themselves. In one embodiment, the markings 40 may be stamped, etched, such as with a laser or other engraver, into the body 22, preventing their removal through wear, damage or otherwise.

As described below, in use, the gauge 20 is aligned or referenced to an indicator. The indicator provides a reference position for wheel geometry. In order to maintain the gauge 20 in a position where it is aligned with or referenced to the indicator, the gauge 20 preferably includes the engaging mechanism 32. In general, the engaging mechanism 32 is configured to connect the gauge 20 to a support element in a fixed position. The configuration of the engaging mechanism 32 may vary depending upon the form of the indicator and the form and configuration of the associated support structure.

In one embodiment, as described in more detail below, an indicator is associated with an axle spindle. In that configuration, the engaging mechanism 32 is configured to engage the wheel or axle spindle to maintain the gauge 20 aligned with or in reference to the indicator.

Figure 5A:
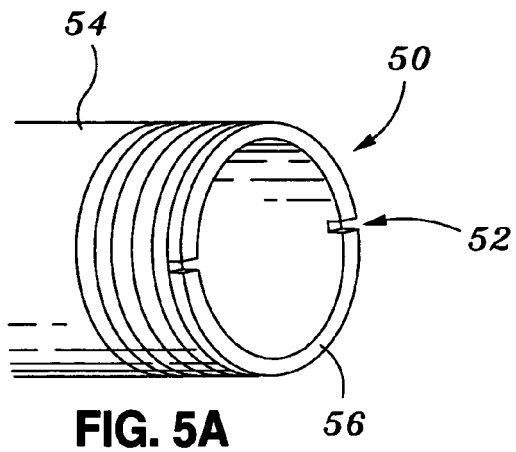
FIG. 5(a) is a perspective view of an end of an axle spindle of a vehicle, the axle spindle bearing an indicator in accordance with the invention.
Figure 5B:
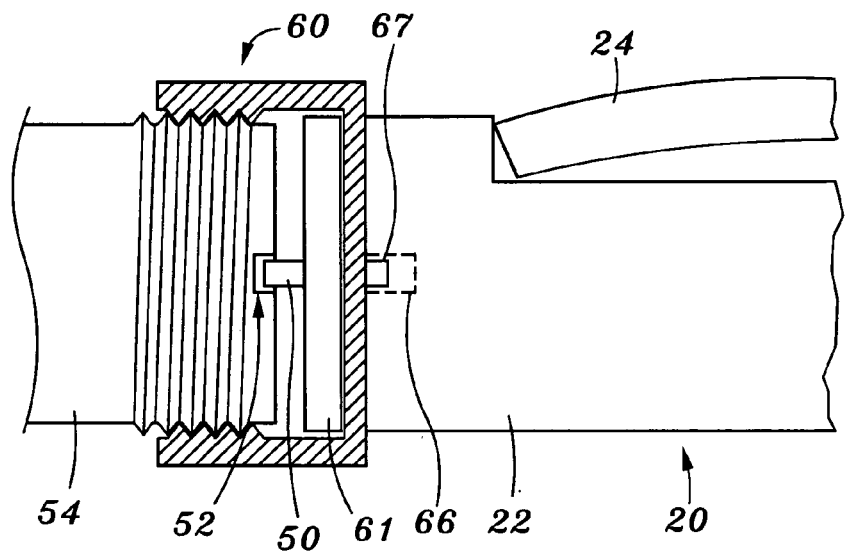
FIG. 5(b) is a top view of the axle spindle illustrated in FIG. 5(a)
Figure 5C:
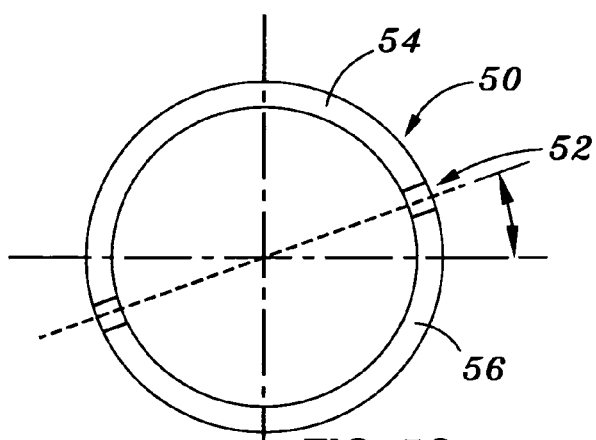
FIG. 5(c) is an end view of the axle spindle illustrated in FIG. 5(c)

FIGS. 5(a)–5(c) illustrate one embodiment of an indicator 50 of the present invention. In general, the indicator provides a reference position for wheel geometry, such that when the wheel geometry is changed, the amount of change can be determined by the change in the position of the indicator from its reference position.

In the embodiment illustrated, the indicator 50 comprises a slot 52 formed in an axle spindle 54. In general, the axle spindle 54 is configured to support a wheel for rotation. The axle spindle 54 may have a variety of shapes and configurations, as is well known in the art.

The slot 52 is formed in the exposed end 56 of the axle spindle 54. Most preferably, the slot 52 is formed in the wheel spindle 54 such that, when the actual caster is zero (0) degrees (i.e. upper and lower ball joints are physically in vertical alignment) and the gauge 20 is referenced to the slot 52, the caster vial 30 reads zero (0) degrees.

One embodiment of an engaging mechanism 32 will be described with reference to FIGS. 3(a), 3(b) and 4(d). This embodiment engaging mechanism 32 is specifically configured to engage a slot-type indicator 50 such as illustrated in FIGS. 5(a) and 5(b) described above.

Referring to FIG. 3(b), the engaging mechanism 32 comprises a securing or connecting member. The securing member is preferably configured to secure the gauge 20 so that it is referenced to the indicator 52. As illustrated, the securing member comprises a mounting or locking ring 60. The mounting ring 60 comprises a generally annular body. At least a portion of the interior of the locking ring 60 is internally threaded, the threads for engaging mating threads on the exterior of the axle spindle 54. In this manner, the gauge 20 may be connected to the axle spindle.

As described, the gauge 20 is referenced to the indicator. Preferably, this means that the gauge 20 is specifically oriented or aligned with the indicator. In the embodiment where the indicator comprises a slot 52, the engaging mechanism 32 preferably includes means for referencing the indicator. In one embodiment, this means comprises a slot-engaging key 58. The key 58 is configured to engage the slot 52 in the axle spindle 54, thus having the appropriate width and length dependent upon the width and length of the slot 52. When the key 58 engages the slot 52, the user is ensured that the gauge 20 is properly aligned with or referenced to the indicator.

In a preferred embodiment, the locking ring 60 is connected to the body 22 of the gauge 20 so that it can rotate independently of the body 22 and the key 58. As illustrated in FIG. 4(d), the key 58 preferably extends from an engaging face 61 of a key mount 63. A mounting flange 64 extends in the opposing direction from the face 61.

At least a portion of the extension 64 securely engages the body 22 of the gauge 20. Preferably, the key mount 63 engages the body 22 in a manner preventing its rotation relative to the body 22. In one embodiment, as best illustrated in FIG. 4(e), a tab 67 extends outwardly from the mounting flange 64 generally opposite the key 58. The tab 67 is configured to engage a slot 69 in the end of the body 22 of the gauge 20. In one embodiment, a pair of generally rectangular tabs 67 are located on either side of a central aperture 71 through the key mount 63. These tabs 67 engage a rectangular slot 69 in the body 22. Most importantly, the tabs 67 and slot 69 are configured so that when they engage, the mounting flange 64 is secured to the body 22 in a position such that when the key 58 engages the slot 52 and the actual caster is zero (0) degrees, the gauge 20 reads or outputs zero (0) degrees.

As illustrated, a locking bolt 66 preferably connects the key mount 63 to the body 22 of the gauge 20. As illustrated, the locking bolt 66 extends through the passage 71 through the key mount 63 into a mating aperture in the body 22 of the gauge 20. The use of the locking bolt 66 allows the key mount 63, and the locking ring 60, to be disconnected from the body 22 of the gauge 20 for replacement or the like.

Of course, the key mount 63 may be configured to engage the gauge 20 in a variety of manners which ensures that the key 58 is oriented properly, other than the tab and slot mounting described, and which preferably allows the key mount 63 to be disconnected from the body 22 of the gauge 20. For example, pins could extend from the key mount 63 into apertures in the body 22. A pin could extend through the body 22 parallel to and through an aperture in the mounting flange 64, maintaining it in the desired position.

The locking ring 60 has a generally closed end 62. This end 62 defines an opening 65 through which the mounting flange 64 of the key mount 63 passes. The opening is sufficiently large to permit the locking ring 62 to rotate about the mounting flange 64. Further, the extension 64 has sufficiently length that the locking ring 60 does not bind between the engaging face 63 of the key mount 63 and the body 22 of the gauge 20. Again, this allows the locking ring 60 to rotate relative to the key mount 63 and the body 22 of the gauge 20.

As described above, when the gauge 20 is referenced to the indicator and the actual caster angle is zero (0) degrees, the gauge 20 preferably yields or outputs a zero (0) caster angle reading. In use, when the caster angle of the wheel is changed, the position of the indicator changes. The actual caster angle can directly be measured with the caster/camber gauge 20. The gauge 20 is aligned with or referenced to the indicator 52. In one embodiment, this is accomplished by engaging the key 58 with the slot 52. The gauge 20 may be retained in a secure position by then rotatably threading the locking ring 60 onto the externally threaded axle spindle 54.

At this time, the caster angle can be read from the caster vial 30. In particular, the position of the bubble of the vial 30 relative to the markings 40 associated with the caster vial 30 yields the caster angle, preferably in degrees.

At the same time, the camber of the wheel can be determined. The camber angle can be determined from the negative or positive camber vial 26,28. If the camber is negative, the negative camber vial 26 will yield a camber angle more than zero (0) degrees. If the camber is positive, the positive camber vial 28 will yield a camber angle of more than zero (0) degrees.

FIG. 5(c) illustrates an aspect of the invention. As described, in one embodiment, the indicator 50 is formed so that when the caster angle of the wheel is zero (0), then the indicator 50 is generally horizontally extending (such that, when the gauge is connected thereto, the caster gauge reads zero). When the caster angle of the wheel is changed, that change in angle is reflected by the change in position of the indicator, as illustrated. Then, when the gauge 20 is aligned with the indicator, the gauge 20 yields the caster angle.

The invention may have a variety of other configurations than just described. First, a wide variety of indicators may be utilized. As detailed, in an embodiment where the spindle is a hollow tube, the indicator may comprise a slot formed across opposing wall portions of the spindle. In the case of a solid spindle, the slot may be formed in entirely across the end surface of the axle spindle.

The indicator need not comprise a physical slot, but may comprise a marking, such as a painted line, etching or the like. The indicator may also have other shapes. For example, the indicator may comprise a pair of spaced-apart apertures which may be engaged by a corresponding pair of outwardly extending tabs or keys associated with the gauge. The indicator may be any of a variety of position identifiers providing a reference for the gauge.

As described, in one embodiment, the indicator has a reference position which, when the gauge is aligned therewith, causes the gauge to read zero (0) caster angle when the actual caster angle is zero (0). Other configurations could be utilized, although less desirable. For example, the reference position for the indicator could be where the gauge reads three (3) degrees positive caster angle when the actual caster angle is zero. In that case, when the actual caster angle is changed to one (1) degree positive, the gauge would output a caster angle of four (4) degrees positive.

As also described, in an embodiment where the caster gauge reads zero (0) caster angle when the gauge is in a horizontal position, the indicator reference position will be that where the indicator is horizontally extending. However, if the caster gauge were configured differently, then the indicator reference position corresponding to an actual caster angle of zero (0) may be at an angle relative to horizontal.

As indicated, the gauge 20 is preferably configured to align with or reference the indicator, thus ensuring the gauge 20 is in the proper position. In one embodiment, this alignment is confirmed by a mechanical connection, i.e. the key fitting in to the slot. Other configurations are possible. For example, the indicator could comprise a key or ledge which the gauge is pressed against. When the indicator is a mark or line, a top edge of the gauge could be aligned with the mark. The gauge may include a sight having an alignment mark which the user aligns with the indicator mark.

As described above, in one embodiment, the caster and camber geometry sensors and the means for displaying the sensed geometry comprises one or more physical or mechanical vials and associated markings. In another embodiment, illustrated in FIGS. 6(a) and 6(b), the gauge may be an electro-mechanical gauge.

Referring first to FIG. 6(a), the sensor of the gauge 100 comprises a dual axis clinometer (not illustrated), such as the AccuStar II/DAS-20 manufactured by Schaevitz Sensors. The clinometer comprises a pair of sealed domes. A high dielectric constant fluid is located between the domes along with a bubble. The lower dome includes capacitive plates. In this embodiment, a body 102 of the gauge 100 may comprise a hollow body which houses the sensor.

The output of the sensor is preferably provided to a display 104. As illustrated, the display preferably comprises a graphical or alphanumeric display. The display 104 may be of a variety of types, including LCD, Plasma, LED, VFD, CRT or others. The display 104 may have touch-screen or other direct input capability. In a preferred embodiment, the gauge 100 is battery powered, such as with a 9V DC battery. The gauge 100 includes appropriate circuitry for processing the output from the sensor and routing the information to the display 104.

Preferably, the gauge 100 once again is configured to be aligned with or reference an indicator. When so aligned, the sensor is preferably configured to output the caster and camber angles to the display 104, as illustrated in FIG. 6(a).

As with the gauge 20 described above, the gauge 100 may include an engaging mechanism 106 for connecting the gauge to the axle spindle in alignment with the indicator thereon. Of course, the gauge 100 may be configured to engage the axle spindle in other fashions as described herein or configured to otherwise align with the indicator.

FIG. 6(b) illustrates another embodiment of gauge 200 in accordance with the invention. This gauge 200 is similar to that just described. In this embodiment, however, the gauge 200 is configured to 5sense and output, such as with a display 204, the caster and camber angles of two or more different wheels, such as both the front wheels of the same vehicle, the rear wheels of a vehicle, a front and rear wheel of a vehicle, or even all four or more wheels of a vehicle.

In use, the gauge 200 is aligned with the indicator associated with a first wheel, such as the right front or rear wheel of a vehicle. The gauge 200 outputs the caster and camber angles of the wheel. The gauge 200 can then be used with the left front or rear wheel. The gauge 200 outputs the caster and camber angles of that wheel. In this manner, the user can determine if both wheels have the desired caster and/or camber angles. Of course, the gauge 200 could be used with any combination of wheels of a vehicle.

In one embodiment, the gauge 200 includes a keypad 206. In one embodiment, the keypad 206 may allow various inputs, such as desired caster and/or camber settings. In such an embodiment, the gauge 200 may be connected and then the actual caster and/or camber angle adjusted. When the desired angle or position is reached, the gauge 200 may provide a signal. The signal may be, for example, by illumination of a light 208 or generation of a sound via a speaker 210.

In addition or alternatively to the keypad 206, the gauge 200 may include a touch-screen or other input device(s). In one embodiment, the display 204 maybe larger and include touch-input capability and display menus or other screen elements for selection by the user or which accept input from the user.

In one embodiment, the gauge 200 is configured as a computing device including a processor and one or more data storage elements (not shown). The data storage element(s) may comprise various memory devices. The memory devices may be integrated with the processor or be separate therefrom and communicate via a bus or other device. The processor is preferably configured to provide information to the display 204 and to accept input from the keypad 206 and other input devices.

In such a configuration, the gauge 200 may store wheel geometry information and recall/display that information. For example, the user may elect to have previously measured wheel geometry information displayed regarding one or more wheels. The gauge 200 may also execute various additional functions, such as calculating and displaying changes in camber between stored and new measurements and the like.

FIG. 6(c) illustrates yet another embodiment of the invention comprising a measuring system. As illustrated, a first gauge 300a and second gauge 300b are similar to the gauge illustrated in FIGS. 6(a) and 6(b) above. Preferably, however, the gauges 300a,b include a wireless transmitter or transceiver. The wireless transmitter permits data to be transmitted from the gauge 300a,b to a remote location. In this manner, geometry information is downloaded or provided to the remote location from the gauge 300a,b.

In one embodiment, abase station 302 includes a wireless receiver or transceiver for receiving data from the gauges 300a,b. The base station 302 also includes a display 304 for displaying the caster and/or camber information.

The gauges 300a,b and the base station 302 may be configured to communicate with one another in a variety of fashions. In one embodiment, the devices communicate using an RF wireless signal and associated devices for implementing an RF wireless protocol, such as an 802.(xx) standard or Bluetooth. In another embodiment, the devices may communicate using an infrared signal and associated devices for implementing an infrared wireless protocol.

Of course, although less desirable, the gauges 300a,b could connect to the base station 302 via wired connection. Also, the gauges 300a,b could include a data storage medium, such as a memory card, for storing the measured information. That information could then be provided to the base station 302 by removing the memory card and inserting it into an appropriate reader of the base station 302.

In this embodiment, two or more gauges may be used to measure wheel geometry of two or more wheels at the same time, as illustrated in FIG. 6(c). In another embodiment, a single gauge could be used to measure the geometry of multiple wheels by moving the gauge from wheel to wheel. In either instance, however, the data may be transmitted to the base station 302 for viewing and manipulation.

It will be appreciated to those of skill in the art that the gauges of the invention may be configured in various fashions. For example, the various electronics utilized may vary.

As described, the caster-camber gauge of the invention may preferably be secured in a position in which it references or aligns with the indicator. In one embodiment, the gauge connects to the axle spindle by way of a threaded locking ring which engages threads on the spindle. FIGS. 7(a) and (b) illustrate another embodiment of the invention where the gauge connects or engages with magnets or magnetic elements.

Referring to FIG. 7(a), the gauge 420 again includes a body 422. The gauge 420 preferably includes sensors, such as the electro-mechanical sensor or mechanical vial sensor described above, for measuring caster and/or camber angle. Preferably, this embodiment gauge 420 has an engaging element 432 which includes one or more magnets or magnetic elements 434.

As illustrated, the magnets or magnetic elements 434 are associated with a magnet housing 436. The housing 436 is connected to the body 422 of the gauge 420, preferably in a similar location as the locking ring of the gauge 20 illustrated in FIG. 5(b).

Referring to FIGS. 7(a) and (b), in one embodiment, the magnet housing 436 is annular in shape. One or more magnets 434 are connected to the housing 436, such as by being embedded in the housing 436. In one embodiment, a plurality of magnets 434 are spaced around the open periphery of the housing 436. The magnets 434 are configured to be attracted to a metallic element. In other embodiments, the housing 436 may be constructed of metal and be magnetized. In another embodiment, a magnetic ring may be attached to the end of the housing 436.

In use, as illustrated in FIG. 7(a), the magnets 434 of the magnetic housing 436 are configured to engage one or more metal support elements. In one embodiment, the magnets 434 are configured to engage the end surface of a wheel hub 438 which surrounds an axle spindle 450. Preferably, the magnet housing 436 is sized so that its end or face will engage the end or face of the wheel hub 438.

Figure 1:
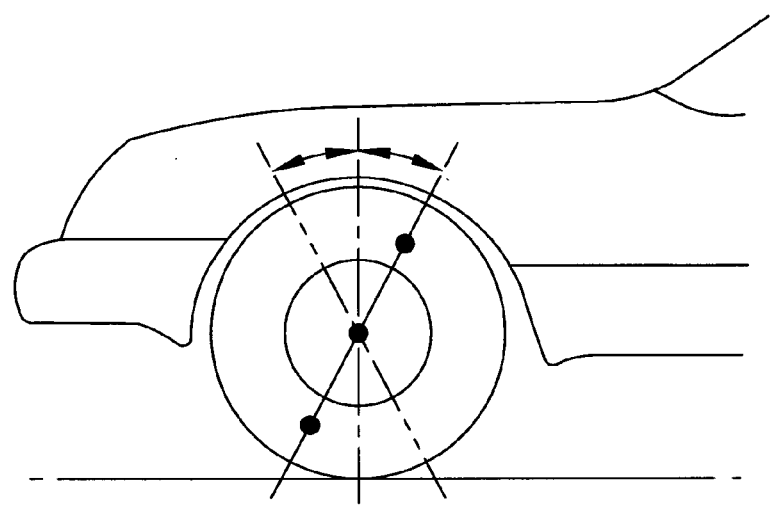
FIG. 1 illustrates caster of a vehicle wheel in accordance with known conventions.
Figure 2:
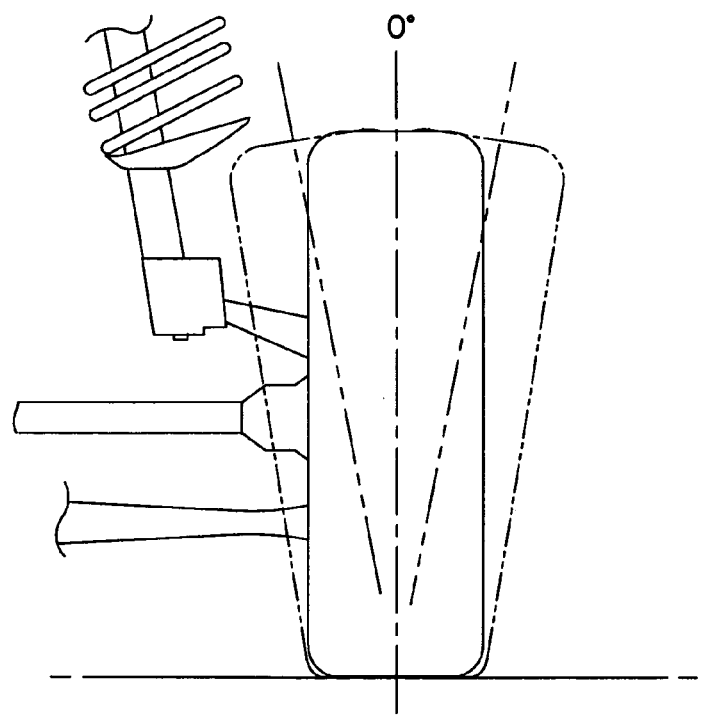
FIG. 2 illustrates camber of a vehicle wheel in accordance with known conventions.

The gauge 420 includes means for aligning with or referencing an indicator. In similar fashion to the gauge 20 illustrated in FIG. 1, the gauge 420 preferably includes a key 458 for engaging a corresponding slot 452 formed in the end of the axle spindle 450, the slot 452 comprising the indicator. This key 458 is preferably mounted so that it extends generally parallel to the gauge 420 (i.e. when the key 458 engages the slot 452 and the actual caster angle is zero, then the gauge 420 reads zero caster angle).

Preferably, means are provided for moving the key 458, so that the gauge 420 may accommodate different wheel hub depths. As illustrated, the key 458 is mounted to one end of a push rod 440. An opposing end of the push rod 440 is preferably mounted for movement relative to the magnet housing 434. As illustrated, the opposing end of the push rod 440 is mounted in a passage 444 formed in the end of the body 422 of the gauge 420. Preferably, the push rod 440 is biased outwardly, such as by a spring 442. Outward movement of the push rod 440 may be limited by a stop (not shown).

Preferably, the push rod 440 is configured to maintain the key 458 in the desired orientation. As described, this orientation is preferably such that the key 458, when it engages a corresponding slot 452 when the actual caster is zero (0) degrees, causes the gauge to output a caster angle of zero (0) degrees. In the preferred embodiment where the gauge is as illustrated with the indicator positioned horizontally in the body of the gauge, the key 458 is preferably horizontally extending. In one embodiment, the push rod 440 has a non-circular cross-section and engages a mating passage, thereby preventing rotation of the push rod 440 relative to the body, thus preventing the orientation of the key 458 from being altered. Of course, other means may be utilized for accomplishing this effect. For example, the push rod 440 may be circular in cross-sectional shape but include one or more pins or other guides which engage the body and prevent rotation of the push rod 440.

In use, the key 458 is biased outwardly into engagement with the slot 452 when the magnet housing 436 engages the wheel hub 438. It will be appreciated that if the depth of the wheel hub 438 (i.e. the distance the wheel hub 438 extends outwardly from the end of the spindle 450) has a great depth, then the key 458 is biased outwardly a greater distance, ensuring that the key 458 engages the slot 452. Similarly, if the gauge 420 is mounted to a wheel hub 438 having a reduced depth, then the key 458 is pressed inwardly, still allowing it to engaged the slot 452 while the magnetic housing 436 at the same time abuts the face of the wheel hub 438.

FIGS. 8(a) and (b) illustrates another embodiment gauge of the invention. This gauge 520 is similar to that illustrated in FIGS. 7(a) and (b), except that the gauge 520 is configured to engage the axle spindle 550.

As illustrated, the gauge 520 once again includes a magnet housing 536. In this embodiment, the housing 536 is generally disc-shaped. One or more magnets 534 are associated with the housing 536, or the housing 536 is magnetized or the like, as described above.

A key 558 extends outwardly from the housing 536. In the embodiment illustrated, the key 558 is fixed in position, such as by being permanently mounted to the housing 536 or a body 522 of the gauge 520.

Referring to FIG. 8(a), the housing 536 has an end or face which is configured to engage the end or face of the axle spindle 550. At the same time, the key 558 is configured to engage a slot 552 in the spindle 550, the slot 552 comprising a caster indicator.

Of course, other means and methods may be utilized to connect or support the gauge in alignment with or reference to the indicator. In one embodiment, the means for connecting may be the same at that used to align the gauge with the indicator. For example, if the indicator is a slot of sufficient depth, the mating key of the gauge may engage with the slot and comprise the sole means of engagement. Other means may be utilized, such as adhesive material. In yet another configuration, the gauge might not actually physically contact the wheel or the associated support structure. For example, the gauge might be mounted to a support stand in a manner permitting the position of the gauge to the adjusted. The gauge might include a visual sight which the user aligns with the indicator during use.

Yet another configuration of a gauge of the invention is illustrated in FIGS. 11(a) and (b). This configuration gauge 800 again comprises a body 802 and an engaging mechanism 804. The gauge 800 also includes a position measuring device, such as a digital level 806. One such level 806 which is commercially available is the SmartTool™ manufactured and sold by Macklanburg-Duncan. This level 806 includes a display 808 configured to display position information (such as angular position in degrees from horizontal). Of course, the measuring device could comprise a wide variety of other devices, including bubble-type levels.

As illustrated in FIG. 11(a), the body 802 is configured to accept the measuring device 806 in an orientation/position in which it measures camber. The body 802 is configured to accept the measuring device 806 in a position for measuring caster as well, as illustrated in FIG. 11(b).

The measuring device 806 may be connected to the body 802. In one embodiment, the measuring device 806 may be connected to the body 802 in a manner permitting it to swivel or rotate between the two positions illustrated in FIGS. 11(a) and (b). In another embodiment, the measuring device 806 may be configured to mount to the body 802 securely in each of the positions. For example, a key (such as an outwardly extending tab) may be connected to the measuring device 806 for engaging one of two slots on the body 802. The slots are configured to accept the key when the measuring device 806 is mounted in the positions illustrated in FIGS. 11(a) and (b). In this manner, the user maybe assured that the measuring device 806 is oriented at the correct position on the body 802.

Of course, the body 802 of the gauge 800 may have a wide variety of shapes other than that illustrated. This particular shape is useful in providing the user with visual information regarding the alignment of the measuring device 806 to the body. The body 802 could, however, be square, round or the like. In one embodiment, alignment markings, such as lines, may be printed, cut or otherwise marked on the top of the body 802 to provide the user with information regarding the proper orientation of the measuring device 806 thereof for measuring caster and camber or other wheel geometry.

The method and apparatus of the invention may be applied to a variety of wheeled vehicles. In one embodiment, the method and apparatus of the invention are utilized to determine the wheel geometry of the front wheel or wheels of an automobile. In another embodiment, the method and apparatus may be utilized to determine the geometry of a rear wheel or its associated support/drive structure.

FIG. 9 illustrates one embodiment of a wheel drive mechanism. This mechanism is often located at the rear of a vehicle and is configured to drive the rear wheels of the vehicle. The mechanism includes a rear axle housing 600. The housing 600 includes an axle tube 602 on either side thereof. Drive axles (not shown) extend through the axle tubes 602, a first end of each drive axle located in the housing 600 and a second end positioned outwardly therefrom for driving a rear wheel. A gear assembly (not shown), generally referred to as "differential gears," is located in the housing 600. A drive shaft (not shown) is rotated by an engine and drives an input yoke 604. The drive input 604 drives, via the gear assembly, the two drive axles.

As is known, in this arrangement, the drive ratio (i.e. the rotational speed of the drive axles relative to the drive shaft) may be varied by selecting different ratios of differential gears. As such, the rear drive mechanism may be configured to be quickly changed or modified, such as in the case of race cars.

The performance of the vehicle may vary depending upon the geometry of the rear axle housing 600. As one point of reference, the performance may vary depending upon the position of the rear axle housing 600 relative to the road surface.

In one embodiment, an indicator 610 is formed one or both axle tubes 602. The indicator 610 may comprise a slot, or as described above, a marking or other element.

Preferably, the indicator 610 is arranged to provide a reference position, such that when the position of the rear axle housing 600 is changed, the change in position of the rear axle housing 600 to the original position or the point of reference can be determined.

In one embodiment, the indicator 610 is created or formed so that it is parallel to a centerline which runs through the input yoke 604. When a caster gauge, such as that described above, is aligned with or engages the indicator 610, the gauge then provides a reading. When the position of the rear axle housing 600 is adjusted, the position of the indicator 610 also changes. The caster gauge then provides a different reading. The difference between the readings provides the user with information regarding the change in position of the rear axle housing 600 in degrees.

As described above, in a method of the invention, the gauge of the invention is aligned or engaged with an indicator. As also described, the indicator is preferably configured or positioned so that when the caster angle of the wheel is zero, the gauge which engages the indicator yields an output of zero caster. In a preferred embodiment, where the gauge reads zero caster angle when the gauge is in the horizontal plane (as illustrated in FIG. 3(a)), the indicator also extends in the horizontal plane. One aspect of the invention is a method of creating or forming the indicator for use with the gauge of the invention.

In one embodiment, the spindle is set up in a mill, the line between existing mounting holes in the spindle (and thus through the upper and lower ball joints) is established, and then the slot is machined into the spindle exactly 90 degrees to that line.

In another embodiment, a caster gauge (such as standard caster gauge of the prior art) is attached to the axle spindle. The actual caster angle of the vehicle suspension is adjusted until the gauge reads zero (0) caster.

The gauge is then removed and a spindle nut is threaded onto the spindle. One embodiment of such a nut 700 is illustrated in FIG. 10. The spindle nut 700 has one or more slots 702 formed in it. As described below, in a preferred embodiment, these slots 702 both serve as an alignment guide and as a cutting guide for forming slots in the end of the spindle. Thus, the slots 702 are preferably deep enough that when the nut 700 is threaded onto the spindle, a portion of the slots overlaps with the spindle, and a portion thereof extend beyond the end of the spindle.

In one embodiment, it is desired that horizontal slots be formed in the spindle. It is thus necessary to align the spindle nut 700 on the spindle so that the slots 702 extend horizontally. As such, a guide 704, such as a flat metal bar, is placed into the exposed portion of the slots 702 of the nut 700. A digital or bubble type level is associated with the guide 704. In one embodiment, the guide 704 is sufficiently wide to accept the level placed thereon.

The nut 700 is rotated until the level indicates horizontal. The nut 700 is then secured so it can no longer rotate relative to the spindle. The guide 704 is removed and a cutter, such as a round carbide cutter is placed in the slots 702, guiding the cutter to cut slots in the end of the spindle.

If the cutter is around carbide cutter, the cutting process forms slots with a base having a radius. If desired, the slots may be squared off. Of course, other means of cutting, such as with a blade or other abrasive material/element, may form generally square slots.

The above-described process may be varied in many ways to properly form the indicator. First, as described above, the indicator need not comprise a slot. For example, the slots in the spindle nut could be used as a guide for a painted or etched indicator.

The method and apparatus of the invention has numerous advantages. Most importantly, the method and apparatus of the invention provides for accurate wheel geometry measurement. This is extremely important, especially in vehicles such as race cars where very small changes in wheel geometry may have very large effects upon vehicle handling.

A significant advantage of the invention is that the wheel geometry can be determined without having to move the wheel or without having to use a variety of complex tools. For example, the invention permits the direct measurement of wheel caster without the need to mount the wheels on rotatable platforms and having to move the wheels between various positions (such as +20 degrees and −20 degrees). Unlike the prior art where measurements of wheel caster are required at two wheel positions, the invention also permits direct measurement of wheel geometry with a single measurement in a single wheel position.

The invention does not require any gauge leveling before or after taking a caster reading, significantly simplifying the process of obtaining caster angle data. In addition, the invention provides both caster and camber geometry information simultaneously. The invention also eliminates the need for two people to set caster. In the previous methods, one person must turn the wheels back and forth while the other levels the gauge and reads the caster data. Now, a single person can measure the caster because wheel rotation is eliminated.

Because of the advantages of the invention, wheel geometry can be obtained much faster than using prior art methods and devices. In the case of a vehicle race environment, this provides a substantial time savings over using conventional methods to obtain camber and caster readings on vehicle wheels. This is especially advantageous in a race or competition vehicle, as the ability to quickly access and change suspension geometry provides added time for track practice and other activities that lead to improving vehicle performance. These advantages of the invention are applicable, however, to production cars, trucks and other vehicles, both new and old.

Due to the fact that competition or race vehicles often utilize higher camber settings than production vehicles, the present invention contains two camber vials (one for positive camber and one for negative camber) that offer an extended reading range. In one embodiment, this range is 0 to 6 degrees. In other embodiments, the range maybe even larger, such as 0 to 10 degrees or more. In accordance with the invention, a wider range of caster angles than those specifically illustrated may be provided.

In a race or competition environment, the rate at which camber or caster settings change as the suspension of the vehicle compresses is of great importance for maximum performance and road-holding capabilities. This change in rate is referred to as camber curve and caster curve. By removing the suspension spring and shock absorber, the present invention allows for the simultaneous reading of the camber and caster changes as the suspension components are raised to simulate the dynamic compression of the suspension in a race environment. The information gained by this method is valuable in making optimal wheel alignment changes.

Changing the camber and caster setting on one side of the vehicle can affect the ride height and camber and caster settings on a wheel at the opposing side and/or end of the vehicle. In normal production vehicles these slight variations have little effect. However in a race car or other competition vehicle, these slight variations can lead to degradation in handling. In accordance with the preset invention, the caster and camber of opposing wheels can be determined simultaneously, such that a change on one side and/or end of the vehicle can be instantly detected on the opposite side and/or end and corrective action taken to optimize the wheel alignments. This method saves substantial time over present methods, especially in view of the fact that no turntables are required for the caster reading.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A method of determining the caster angle of a vehicle wheel which is mounted to a vehicle wheel support structure of the vehicle with a gauge configured to output caster angle, comprising the steps of:
   providing an indicator directly mounted on said vehicle wheel support structure, said indicator configured such that when said gauge is aligned with said indicator when said caster angle is zero, said gauge yields an output of zero caster angle;
   aligning said gauge with said indicator in accordance with a current position of said indicator associated with a current caster setting of said wheel; and
   outputting said new caster angle.

2. The method in accordance with claim 1 wherein said vehicle wheel support structure comprises an axle spindle and said indicator comprises a slot formed in said spindle, and wherein said gauge includes a key configured to engage said slot.

3. The method in accordance with claim 1 wherein said indicator is oriented horizontally when said caster angle is zero and said gauge yields a zero caster angle when said gauge is oriented horizontally.

4. The method in accordance with claim 1 including the step of connecting said gauge to said vehicle wheel support structure.

5. The method in accordance with claim 4 wherein said gauge includes a threaded lock ring, said support comprises an axle spindle which is externally threaded and said step of connecting comprises engaging said lock ring with said threads on said spindle.

6. The method in accordance with claim 4 wherein at least a portion of said vehicle wheel support structure comprises metal and said gauge includes one or more magnetic elements and said step of connecting comprises engaging said magnetic elements with said metal.

7. A gauge configured to output vehicle wheel geometry information comprising:
   a body;
   an engaging member connected to said body, said engaging member configured to directly connect to a vehicle wheel support structure for a vehicle wheel;

a key provided to said engaging member and configured to engage at least one slot in said vehicle wheel support structure;

at least one sensor configured to detect the position of the body relative to a horizontal plane, said sensor indicating zero caster angle when said key engages said slot in said vehicle wheel support structure when said slot is in a first position corresponding to that when said caster angle is zero and configured to indicate a positive or negative caster angle when said key engages said slot in said vehicle wheel support structure when said slot is in a second position offset from said first position.

8. The gauge in accordance with claim 7 wherein said engaging member comprises a threaded lock ring configured to engage threads on said vehicle wheel support structure.

9. The gauge in accordance with claim 7 wherein said engaging member comprises at least one magnetic element configured to engage a metallic portion of said vehicle wheel support structure.

10. The gauge in accordance with claim 9 wherein said metallic portion comprises a wheel hub.

11. The gauge in accordance with claim 7 wherein said at least one sensor comprises an electro-mechanical sensor and an output of said sensor is provided on an electronic display.

12. The gauge in accordance with claim 7 wherein said at least one sensor comprises a bubble vial.

13. The gauge in accordance with claim 7 configured to provide camber angle, said at least one sensor including a caster bubble vial and a pair of camber bubble vials.

14. The gauge in accordance with claim 13 wherein said pair of camber bubble vials extend generally parallel to one another and generally perpendicular to said caster bubble vial.

* * * * *